Nov. 22, 1938.  W. BUSCHBECK  2,137,265
CIRCUIT FOR SUPPRESSING DISTURBANCE WAVES AND UPPER HARMONICS
Filed Aug. 4, 1937

INVENTOR
W. BUSCHBECK
BY
ATTORNEY

Patented Nov. 22, 1938

2,137,265

UNITED STATES PATENT OFFICE 2,137,265

CIRCUIT FOR SUPPRESSING DISTURBANCE WAVES AND UPPER HARMONICS

Werner Buschbeck, Berlin, Germany, assignor to Telefunken Gesellschaft für Drahtlose Telegraphie m. b. H., Berlin, Germany, a corporation of Germany Application August 4, 1937, Serial No. 157,240
In Germany July 11, 1936

3 Claims. (Cl. 179—171)

The invention relates to a circuit for suppressing disturbing resonances of upper harmonics, and disturbing oscillations in high frequency transmitters or high frequency amplifiers.

At the production and amplification of oscillations, more especially such of very high frequency, it is known that disturbance oscillations appear, the causes of which differ considerably. The non-sinusoidal course or form of the anode current and grid current is primarily responsible for upper harmonics which can produce voltages of upper harmonics in any circuit or portions of circuits acting as resonance structure for a certain frequency. In push pull circuits there may furthermore be encountered additional undesired oscillation producing circuits formed by the tubes and connections operating as if the tubes were connected in parallel. In this case the inductance of the said additional oscillatory circuit comprises primarily the lead-in choke, supplying the direct current plate potential, connected to the electrical center of the high frequency inductance between the anodes, and the two parts of the high frequency inductance of the oscillatory circuit operating in parallel.

With the means disclosed in accordance with this invention resonances of upper harmonics and disturbance oscillations are damped in the circuits having an output circuit symmetrical or approximately symmetrical as regards cathode potential or ground. This is the case for all push pull circuits for tube circuits with neutralized anodes and also for simple tube circuits.

In accordance with the invention, there is placed in parallel to the entire capacity of the oscillatory circuit or to a part thereof, a subdivided capacitance a point on which is connected by an ohmic resistor to the point of the capacity of the oscillatory circuit having cathode potential.

Figure 1:
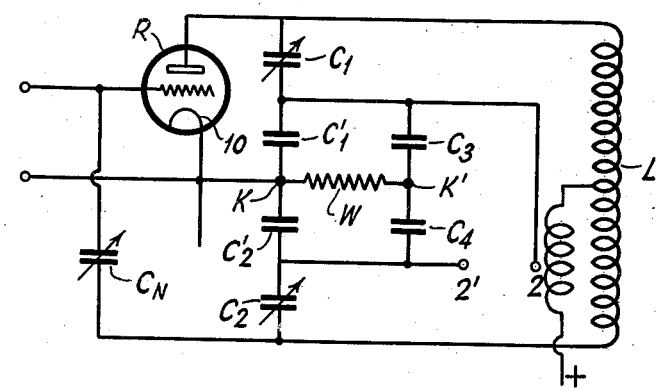
Figure 2:
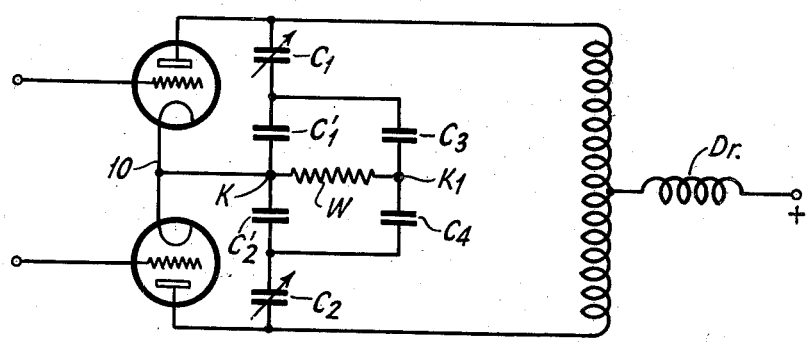
Figure 3:
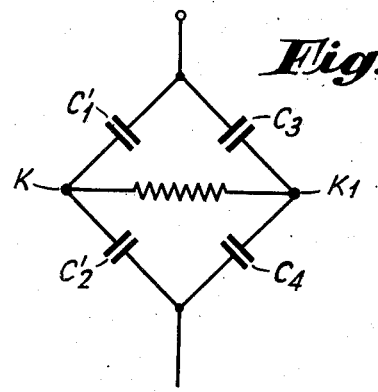

In describing my invention in detail reference will be made to the attached drawing wherein, Figures 1 and 2 show my novel means applied to a single tube stage and a push-pull stage respectively; while Figure 3 illustrates my novel means in the form of a bridge balanced at the desired frequency and unbalanced at other frequencies.

Figure 1 shows a simple tube amplifier circuit with tube R, plate inductance L and oscillatory circuit capacity $C_1$, $C'_1$ $C_2$, $C'_2$ subdivided into several parts. The cathode 10 of the tube R is connected to the center K of the capacity of the oscillatory circuit, so that the oscillatory circuit is symmetrical with respect to cathode 10. The grid to anode capacity of the tube R can likewise be neutralized across the condenser $C_n$. In accordance with the invention there is placed in parallel to the entire capacity of the oscillatory circuit or to a part thereof the capacity $C_3$, $C_4$ divided in the center at K'. The point K' is connected by a resistor W to the symmetrical point K of the capacity of the oscillatory circuit.

The operating performance of the circuit is as follows: For the frequency to which the oscillatory circuit LC is tuned, the points K and K' represent equi-potential points, since the high frequency current flows uniformly through all parts of the oscillatory circuit. The resistor W therefore has no effect as regards the working frequency. If, however, voltages of upper harmonics appear at the anode of the tube R, these voltages appear to a greater extent across the capacities $C_1$ and $C'_1$ the current flowing to the cathode. The inductance L acts as a choke to these voltages and no voltages appear across the coil L of the oscillatory circuit, and hence no voltages at these frequencies appear across the capacities $C_2$, $C'_2$. As a result thereof, the points K and K' are no longer equi-potential points as regards the upper harmonics. The voltage between points K and K' tends to equalize across the resistor W thus producing a high damping effect as regards the upper harmonics. As a result voltage derived for instance at the points 2 and 2' is practically free of upper harmonics.

Figure 2 shows my scheme incorporated in a push pull circuit. In this circuit no upper harmonics of the above described type can appear, since the voltage of the upper harmonics is produced in an identical manner at both ends of the capacity of the oscillatory circuit, so that therefore the points K and K' are still equi-potential points. As stated in the beginning, a push-pull circuit may, however, operate as if the anodes of both tubes were equi-potential points, whereby the anode choke $D_r$ and the two halves of the inductance L acts as the inductance of the oscillatory circuit. As seen from Figure 2, for this type of oscillations the point K and K' do not represent equi-potential points so that the resistance between them has a damping action as in the case of Figure 1.

The arrangements shown in Figures 1 and 2 are completely symmetrical in the plate circuit thereof as regards ground. This is not necessary, however, since in Figure 1 for instance, the capacity $C_2$ may be omitted and $C_N$ may instead be changed accordingly. The general rule for suppressing the disturbance oscillations is that the total capacity of the oscillatory circuit or a part thereof is designed as capacity bridge such that two diagonal points, one of which has cathode potential, are equi-potential points at the operating frequency and that between these diagonal points an ohmic resistor is inserted. The bridge circuit is again shown in Figure 3. The point K has cathode potential, and the capacities $C'_1$, $C'_2$, $C_3$, $C_4$ are so chosen that K' is at the operating frequency equi-potential relative to point K. At other frequencies a voltage will be set up between K and K' as pointed out above.

The two examples of construction according to the invention show that all the various types of upper harmonics and disturbance oscillations can be damped or eliminated only by inserting two condensers and a resistor, without thereby influencing in the least the working oscillation. The two condensers and the resistor can be formed into a structural unit so that they require only a very small space and can be inserted in the simplest manner.

I claim:

1. In a signalling system in combination, an electron discharge device having input electrodes including a control grid and cathode on which wave energy may be impressed and an anode, an alternating current circuit including a plurality of series reactances one or more of which may be used for tuning purposes, a connection between one terminal of said circuit and said anode electrode, means connecting a point between two of said reactances to the cathode of said tube, means connecting the remaining terminal of said circuit to the control grid of said tube and means for preventing the development in said circuit and means, of oscillations of a frequency other than the frequency of the wave to be relayed comprising additional series reactances connected in shunt to said first series reactances to form therewith a bridge circuit, and an energy dissipating element connecting a point between two of said additional series reactances to said point between two of said first named series reactances connected to said cathode.

2. In a signalling system in combination, wave energy amplifying and relaying means comprising a pair of electron discharge devices having input electrodes on which wave energy to be relayed may be impressed and having output electrodes connected in push-pull relation, said tubes having cathodes connected together, a plurality of similar series reactances connected between said output electrodes, at least one of said reactances being variable for tuning purposes, a connection between a common point on said reactances and the cathodes of said tubes and means for preventing the production of undesired oscillations in said output circuit including additional reactances connected in shunt to a pair of said series reactances to form therewith a bridge circuit, and an energy dissipating element in a diagonal of said bridge circuit.

3. In a wave energy amplifying system, a high frequency circuit comprising adjustable reactance including an inductance shunted by a plurality of series capacities, means for impressing high frequency voltages on said circuit to set up therein oscillatory wave energy of a frequency determined by the reactance of said circuit and means for preventing the setting up of oscillatory energy of a frequency greater than the frequency of said first named oscillatory energy comprising additional series capacities connected in shunt with a pair of said first capacities to form therewith a bridge circuit substantially balanced at the frequency of said first named oscillatory energy, said bridge circuit being unbalanced at oscillatory energy of different frequency, and an impedance connected between diagonal points on said bridge circuit to damp or suppress voltages at said other frequencies for which said bridge circuit is not balanced.

WERNER BUSCHBECK.